July 7, 1964     H. E. WALTER     3,140,220
THERMAL INSULATION AND METHOD OF MANUFACTURE
Filed May 19, 1958     4 Sheets-Sheet 1

INVENTOR.
Henry E. Walter
BY
W. Bartlett Jones,
Attorney

July 7, 1964  H. E. WALTER  3,140,220
THERMAL INSULATION AND METHOD OF MANUFACTURE
Filed May 19, 1958  4 Sheets-Sheet 2

INVENTOR.
Henry E. Walter
BY W. Bartlett Jones,
Attorney

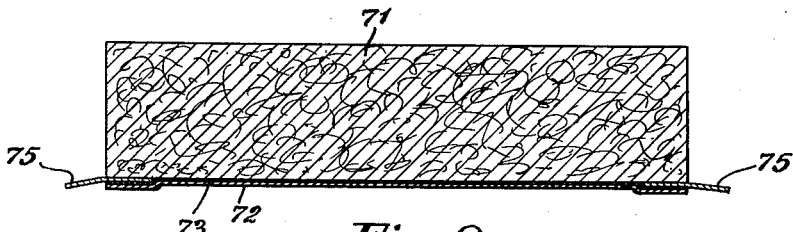
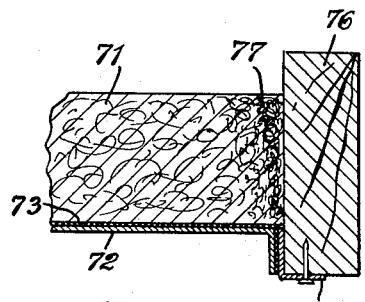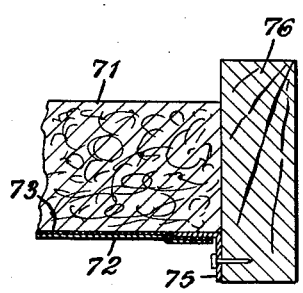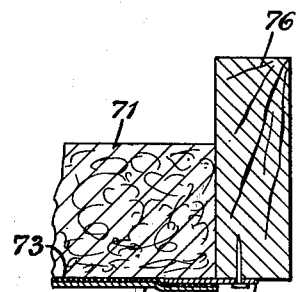
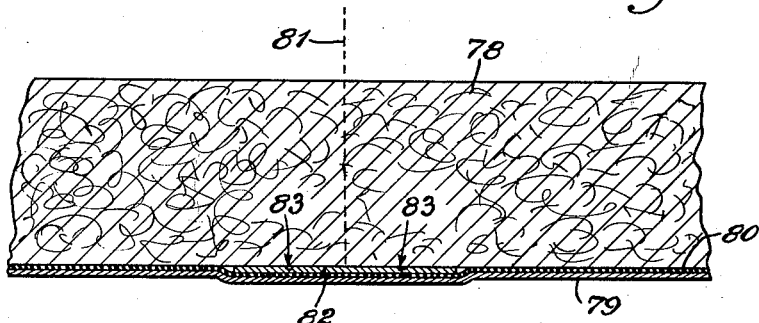
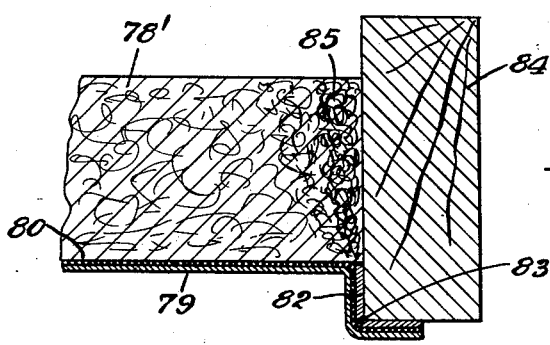

July 7, 1964  H. E. WALTER  3,140,220
THERMAL INSULATION AND METHOD OF MANUFACTURE
Filed May 19, 1958  4 Sheets-Sheet 4

INVENTOR.
Henry E. Walter
BY W. Bartlett Jones,
Attorney

United States Patent Office 3,140,220
Patented July 7, 1964

3,140,220
THERMAL INSULATION AND METHOD OF MANUFACTURE
Henry E. Walter, Cloquet, Minn., assignor to Wood Conversion Company, St. Paul, Minn., a corporation of Delaware
Filed May 19, 1958, Ser. No. 736,266
4 Claims. (Cl. 161—104)

The present invention relates to the manufacture of a thermal insulation structure having mounting means. In particular, it relates to a simple method of producing insulation which when installed is as efficient and useful as more complicated structures of greater cost for comparable results.

It has long been a custom to make insulating webs of considerable width on continuous machines, and in the machine to adhesively unite a sheet liner to the width. For the commercial product the wide lined web so formed is slit into a plurality of narrower lengths. The slitting provides an insulating length covered on one face by a liner adhered to it over areas including areas adjacent the slit-formed edges.

It is customary in this strip-form or bat-form of insulation, with or without said applied liner, to provide mounting flanges extending laterally away from the insulating thickness. This is commonly done by securing to a length a sheet-liner, portions of which extend laterally to provide mounting flanges along the side edges. These flanges are used to secure the structure to framing members.

One way heretofore employed to provide flanges is to secure to a slit strip of a previously lined wider web a second liner over the unlined face, the second liner being wider than the slit strip to provide flanges, with the sheet material usually extended in width to be reversely folded so as to overlap the first liner to which it, the second liner, is secured. The two liners thus form a flanged tubular envelope enclosing the insulating length.

The present invention aims to provide a lined structure having mounting flanges without need for a second liner, and an improved process for producing the same.

The invention may be carried out in numerous ways and the preferred way is to form a wide web, apply a liner to one face of the web according to particular requirements of the present invention, and then to slit the wider web into a plurality of narrow ones, thereby to provide a face-lined product of the present invention.

In order to explain the various features of the invention the product itself is first illustrated and described in a generic sense, followed by detail as to product and method, by reference to the following drawings, in which:

FIG. 9 represents a slit-length resulting from structure shown in FIG. 8 with the folded partitioning strips opened to provide mounting flanges.

FIGS. 9a, 9b and 9c show three methods of mounting the insulation of FIG. 9 to a stud.

FIG. 10 shows a structure in which the partitioning strip is scored for folding.

FIG. 11 shows the method of mounting a structure resulting from FIG. 10 by folding to a corner flange.

It is to be understood that the drawings are illustrative only and are not to be construed as limitations of the invention further described herein.

Figure 1:
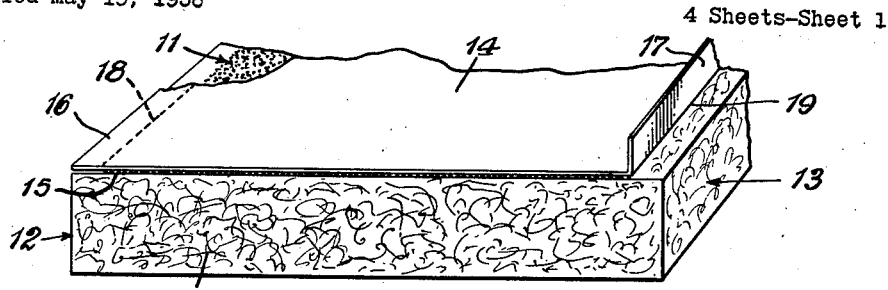
FIG. 1 is a diagrammatic perspective illustration of a length of insulation indicating the relationship between insulation, the liner and mounting flange.

FIG. 1 shows diagrammatically a body 10 which is a length of insulating material having a plane face 11 and two parallel edge-faces 12 and 13 at right angles to the plane face. Over the plane face and coincident therewith is a sheet liner 14, secured by interfacial adhesive 15. The interfacial area having the adhesive may be fully covered or spotted or stripped with adhesive, but excludes narrow band areas of the interface along the junctions of the lined face 11 with edge-faces 12 and 13, so that there are unsecured edge-bands 16 and 17 of liner 14 which edge-bands may be folded away from the body 10 if desired along lines indicated by the numerals 18 and 19, the band 17 being shown so folded.

Figure 2:
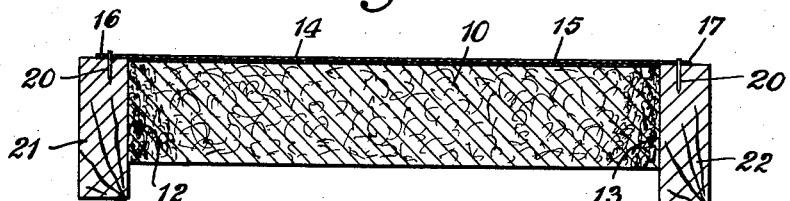
FIG. 2 is a cross-section of insulation according to FIG. 1 mounted in one way between two framing members.
Figure 3:
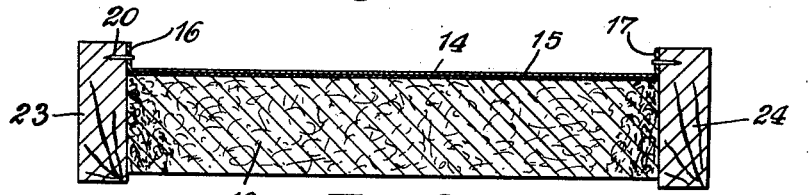
FIG. 3 is a view similar to FIG. 2 showing a second way of mounting the insulation of FIG. 1.

In the form specifically illustrated in FIG. 1, the lines 18 and 19 are shown as spaced apart by an amount which is any standard space between framing members, such as those shown in FIGS. 2 and 3. But a form will be described wherein the full width of the insulating body 10 conforms to said space.

FIG. 2 shows the edge-bands 16 and 17 secured as by staples 20 to the faces of framing members 21 and 22, and the insulating body 10 laterally compressed between the edge-faces 12 and 13.

FIG. 3 shows a second way of mounting the structure of FIG. 1 between framing members 23 and 24 by the same squeezing of body 10 into the open space, and with the edge-bands 16 and 17 folded out 90° and secured to the inside faces of the members 23 and 24. The edges of the adhesive layer establish folding lines for the flanges.

From the foregoing it is obvious that the body 10 as specifically referred to in FIG. 1 cannot be a rigid body from faces 12 to 13, but must be compressible along that dimension at least to permit the extent of squeezing indicated. There are many types of qualifying insulating bodies. Foamed elastomers qualify but in general, are more costly than the preferred fiber felts. The latter may be of mineral fiber or vegetable fibers, adequately embodied in self-sustaining form. Felting alone is sufficient with especially long fibers, such as cotton, or rock wool or glass fibers, but in the case of short fibers as from wood, a bond of fiber to fiber is required, and this is frequently employed in the case of longer fibers.

Any insulating body which is compressible as required is also flexible to a degree, but flexibility is not an essential requirement. A body 10 may be rigid in part so long as the regions forming the side faces 12 and 13 are flexible. Certain forms later described may be rigid throughout and non-compressible in mounting.

In compressing the body 10 to a narrower width, it may appear from the foregoing that the adhesive union inwardly from the lines 18 and 19 prevents compression of the portions of the body 10 at the adhesive interface. Practically, however, the bond of the adhesive to the body 10, and the internal bonds of body 10 yield to the forces used in compressing the width, with resulting tearing of sufficient bonds to accomplish the result.

Figure 4:
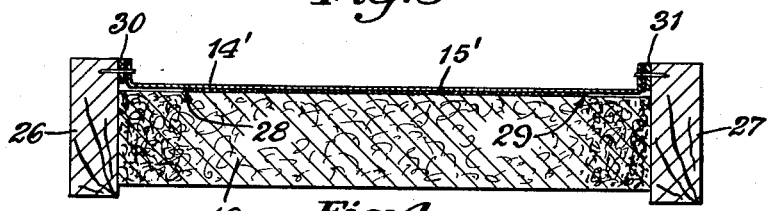
FIG. 4 is a mounted modified form of insulation of FIG. 1 showing the presence of a reinforcing strip for the mounting flange, and showing a modified region of adhesion between the liner and insulation.

FIG. 4 represents a modified form in which such tearing may be avoided, but practically it need not be utilized. In FIG. 4, the compressible insulating body 10 is squeezed between members 26 and 27 as in FIG. 3. The liner 14' is secured by adhesive 15' having outer boundaries 28 and 29 spaced inwardly from the framing members 26 and 27 so that the edge-portions of body 10 between lines 28 and 29 and the respective framing members may be compressed without tearing. As shown in FIG. 4, the edges of the adhesive layer do not define folding lines for the flanges, but folding lines may be established by including reinforcing strips 30 and 31 as later described herein.

The presently preferred form of the structure generically indicated in FIG. 1 is the result of a modification in the process of continuously forming a wide web of a flexible bonded wood fiber felt having on one face a liner adhesively secured thereto, which lined web as it is formed with selvedge edges is slit lengthwise into at least one narrower length. Where one narrower length results, the slitting may form edge-trim or waste. Where several narrower lengths result, there also may be edge-trim.

The modifications may involve numerous changes in the process of forming the felt and combining it with the initial facial liner. Heretofore, the wood fiber felt to which reference has been made, has been used to form an insulating blanket with liners adhesively united to both faces. Accordingly, the fiber density at the faces has necessarily been such as to have sufficient body strength to receive and hold a liner adhesively.

Since the preferred form of the present invention has but one facil liner, the unlined face does not require the fiber desity heretofore provided for lining the face, and by providing a lower density, added insulation capacity results. But since one face requires a liner which must carry and sustain the body 10, the lined face must have a suitably high density.

Heretofore, the wood fiber mat has been made by airlaying fibers intermingled in suspension with a mist of adhesive, such as a starch sol, as set forth in the U.S. Patents Nos. 2,363,480, 2,610,138, 2,493,194 and 2,746,138.

A low-density deposit averaging about ½ to ¾ pounds of dry fiber per cu. ft. is first formed which, as moist, has no self-sustaining strength. Heretofore, it has been densified by rolling before the adhesive has set to increase the bonding and this has effected a substantially uniform density in the thickness dimension of about 2 lbs. per cu. ft.

By the preferred modification, the initially deposited low-density layer is only slightly densified before the adhesive has set, in one respect to provide a level top surface parallel to the bottom face on the forming conveyor. The initially deposited low-density layer is not of uniform density being more dense at the bottom by reason of the weight of wet fibers above. The initial densification for leveling is not sufficient to bring the top layer to the density of the bottom layer, nor is it desirable thereafter to compress to uniform density.

After the said leveling densification, the wet mat has insufficient strength to permit it to be couched from a forming conveyor to a second conveyor for passage through a drying oven, especially since it adheres, as formed, to the usual screen conveyor on which it is formed. Efforts to couch it from this adhered condition break the web. One way heretofore employed to couch the web for drying is that shown in said U.S. Patent No. 2,493,194 to Heino, wherein the forming conveyor prior to reaching the couching region is bounced, vertically by short-rapid impacts which break the adhesion of the bottom layer to the conveyor. This has been effected heretofore on a mat already compressed to a uniform density, but when practiced on a mat not so compacted, as described above, the bouncing also effects a localized densification at the bottom layer while retaining decreasing densification upwardly therefrom. The conditions are maintained such that the bouncing so densifies the loosened bottom layer that it may be couched to the drier conveyor, and in so doing the upper layers are carried with it without rupture.

In the drier, the preferred method of drying is to pass hot air, by differential pressure through the wet mat from the top low-density side to the bottom. This has a compacting effect registered throughout the thickness while the adhesive in the mat remains unset and the fibers moist. Since the top dries first, it becomes set first to resist densification in the drier, while the bottom, which dries last, continues to register densification after the top is set and dry.

The result above described is to form a fiber felt new in character in having a graded density from higher at one face to lower at the other. Such a fiber mat having a thickness of 4 inches and an average density of approximately 0.85 pound per cu. ft., is exemplified by two samples having layers of different densities, as follows:

| Layer | Lbs./cu. ft. No. 1 | No. 2 |
|---|---|---|
| Lower half-inch | 1.79 | 1.84 |
| Second half-inch | 1.03 | 1.59 |
| Second inch | 0.89 | 0.86 |
| Third inch | 0.61 | 0.59 |
| Fourth inch | 0.58 | 0.59 |

Figure 5:
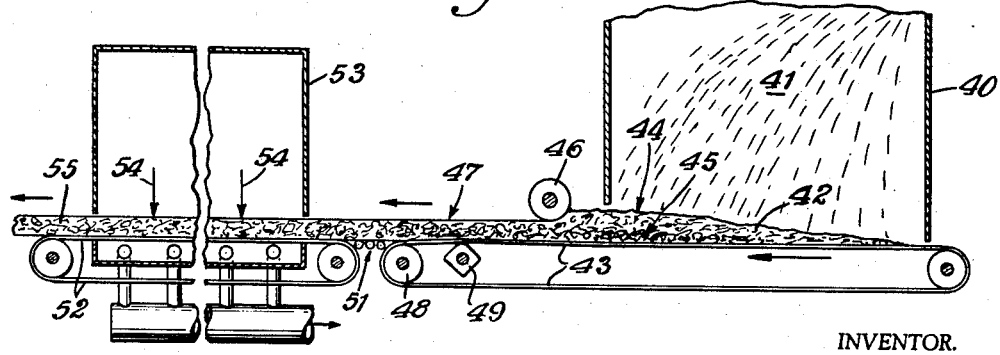
FIG. 5 is a diagrammatic cross-sectional view of one way of forming fibrous insulation especially adapted for use in the present invention.

FIG. 5 represents more or less diagrammatically apparatus to perform the processing above referred to.

In FIG. 5 a depositing chamber 40 containing a shower of fibers 41 into which liquid adhesive has been sprayed, as by the processes referred to, builds up a low-density mat 42 on a screen conveyor 43. The mat 42 is shown as having an irregular surface 44, which is characteristic of the forming process referred to.

The lower layers 45 of mat 42 are denser than the top layer. Then a leveling roll 46 slightly compresses the mat more to produce a level face 47 than to increase the overall density, but effecting sufficient densification of the top to give it adequate ruggedness for the handling to which it is to be exposed.

Just before the screen 43 reverses its direction over roll 48, a bouncing roll 49 rapidly beats the conveyor and loosens the mat so that it may be couched over a bank of small rolls 51 to a drier conveyer 52 entering oven 53. In the oven hot drying air at about 250° to 275° F. is forced through the mat, as indicated by arrows 54, drying it and further densifying it as described above, for discharging dry mat 55.

The dry mat continues in a production line to a laminating station at which a liner carrying adhesive, preferably melted or tacky asphalt, is pressed onto the under face of the mat.

The adhesive on the liner may be lacking at the regions which are to be slit so as to provide the described edge-bands.

The preferred method is to apply adhesive over the entire face of the liner, and to ride into the interface parting strips which prevent adhesion of the asphalt to the mat where the edge-bands are to be formed. Aside from mechanical advantages, this practice introduces additional thickness at the regions of the liner which are to form the mounting flanges.

Figure 6:
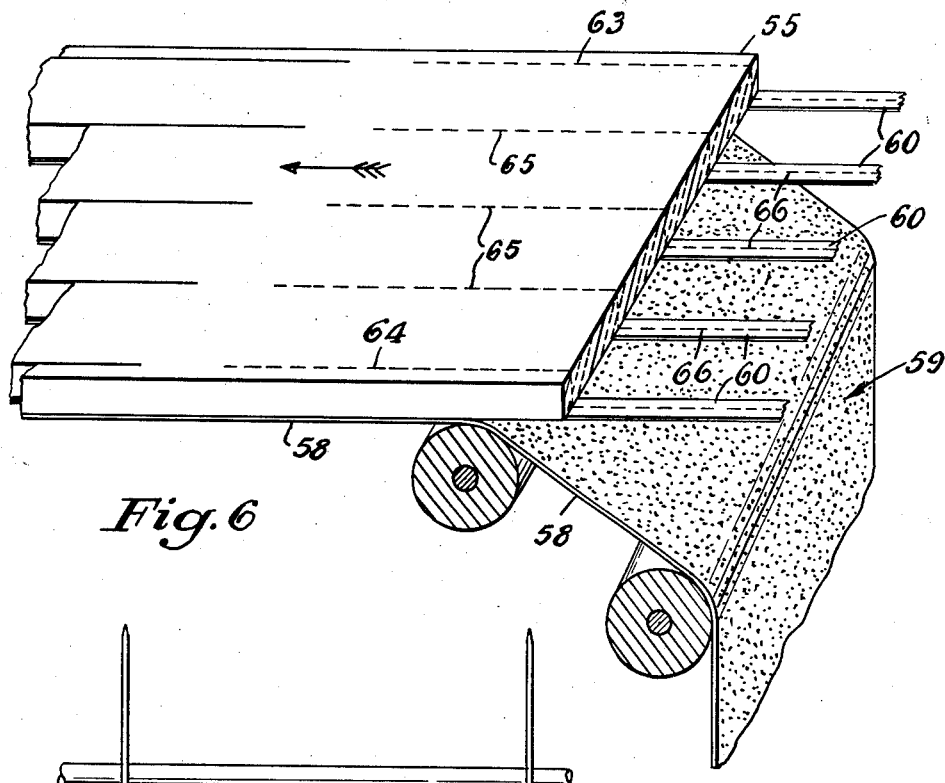
FIG. 6 is a fragmentary perspective illustration of a method of combining insulation which may be formed as in FIG. 5 with a liner, and with partitioning strips for forming mounting flanges.

FIG. 6 shows the preferred modification of conventional practice in securing a liner to a wide web discharged from the drier 53. Numeral 55 represents the dried wide web being conveyed forwardly after leaving the drier. Approaching the web 55 at the same forward speed is a sheet liner 58 faced over its entire surface with hot liquid asphalt 59 as the adhesive. Upon union of the two webs adhesion normally occurs, but, since union is to be avoided where the edge-bands are to form, there is introduced at the interface one or more parting strips, as of paper or heavy chipboard 60. One side unites to the sheet liner. The strips 60 when suitably heavy, forms reinforcement to the edge-band as the mounting flange.

The dotted lines shown on the fiber mat and on the paper strips 60 merely indicate for convenience in illustration where the web is to be slit and edge-trimmed. The trim lines on the mat are designated 63 and 64, and the intermediate slit-lines are designated 65 on the mat and 66 on the strips. The strips 60 at the slit lines are located so that they are slit in the middle, thus to form with the liner reinforced edge-bands of the same width as the slit strips. The strips at the trim-lines are located so that the portion not wasted in trim has the same width as the slit strip portions formed at the slit-lines 65.

It is preferred that the liner 58 when it is paper, be adhesively united to the felt at the entire area between the edge-bands by an adhesive like asphalt which has resistance to the transmission of moisture, for many uses of the final structure. The adhesive shown in FIG. 6 on the liner 58 may be applied in lines or other irregular areas sufficient to carry the mat by the liner, and in so doing the areas at which the paper strips are shown may be left blank of adhesive, thus dispensing with the need of such strips. However, this is preferred only when the liner itself is such that the resulting edge-bands formed from it are sufficiently strong to serve as mounting flanges, and when the apparatus makes it convenient to apply the adhesive on localized areas.

Figure 7:
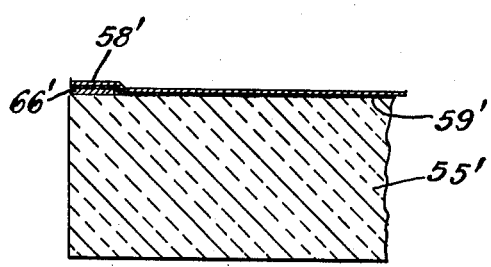
FIG. 7 is a fragmentary cross-section of a slit-length of insulation resulting from the processing illustrated in FIG. 6.

The narrow strip resulting from the operations above described is illustrated by a structure similar to that shown in FIG. 7, shown in exaggeration, wherein the insulating strip 55' has a strip 58' of the liner and half-portions 66' of the strips 66. The stippling 59' indicates the asphalt. As a result, the strip 55' must be compressed edgewise to use the free flanges thus formed. To avoid the need for so compressing the mat, the strips 66 may be modified as shown in FIG. 8.

Figure 8:
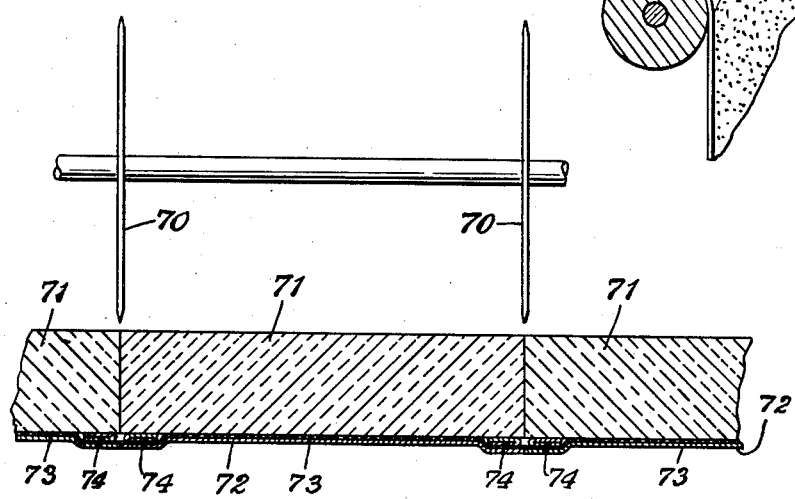
FIG. 8 is a fragmentary view of a structure formed by the method of FIG. 6 in which the partitioning strips are folded as inserted.

FIG. 8 represents in cross-section a portion of a wide mat as it is slit by rotary disks 70 into a plurality of narrow insulation strips 71. A covering liner 72 coated overall with asphalt 73 is shown united to the strips except at the bands adjacent the slit lines. In place of introducing flat strips as shown at 66 in FIG. 6, folded strips 74 are inserted at each side of the slit line, so that on unfolding the strip as shown in FIG. 9, extending flanges 75 are available and the mat 71 may or may not be compressed.

FIGS. 9ª, 9ᵇ and 9ᶜ show three ways of mounting the readied length shown in FIG. 9, indicating but one side of a length secured to a stud 76. In FIG. 9ª, the entire partitioning strip 74 of FIG. 8 is used as an angular flange by edgewise compressing the regions 77 of the insulation 71. In FIG. 9ᵇ the projecting flange 75 is used on the side of stud 76 without compressing the insulation 71. The two mountings of FIGS. 9ª and 9ᵇ form an air space at the mounted face. In FIG. 9ᶜ the projecting flange 75 is secured to the wall-face of stud 76 without compressing the insulation, and without forming such an air space.

FIGS. 10 and 11 show a modified flat partitioning strip scored for folding to provide a corner flange, that is, in effect to modify the flange 17 of FIG. 1 by introducing a median score line. In FIG. 10 the wide mat 78 to be slit is combined with liner 79 carrying an overall facing of adhesive asphalt 80. At the slit-line 81, a partitioning strip 82 is introduced which is wider than the strip 66 of FIG. 6. Strip 82 has two score-lines 83 for folding. FIG. 11 shows how the slit lengths from FIG. 10 may be mounted to a stud 84. The slit length 78' of insulation is compressed at the region 85 to expose the slit-half of strip 82 which is folded at the score-line 83 to fit over the corner of stud 84.

The products and method above described are not to be considered as limiting the invention. They are presently preferred because they effect a reinforcement of the portion of the liner to be used as a flange. Where such a reinforcement may be dispensed with, as when the liner is suitably strong per se to provide the desired flange, a modification may be practiced.

Figure 12:
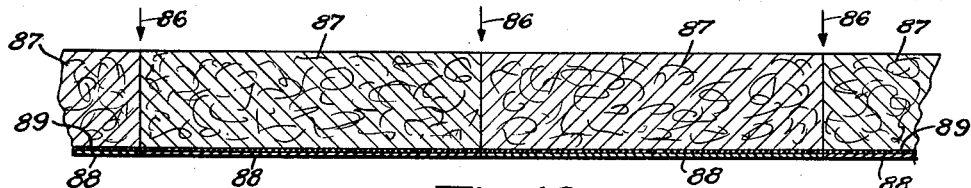
FIG. 12 shows a structure according to the prior art as made by the method of FIG. 6 omitting the partitioning strips.

FIG. 12 represents in cross-section a fragmentary width slit along lines 86 into narrow lengths 87 each with a liner 88 united by asphalt 89 to the entire face of the length.

Figure 13:
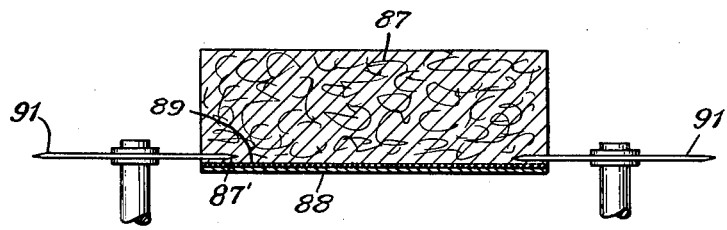
FIG. 13 shows a slit-length of the wide web of FIG. 12 being cut laterally at regions close to the edges of the liner whereby to provide mounting flanges.

FIG. 13 represents a single length from FIG. 12 being slit inwardly by rotary disk cutters 91 just within the liner 88, and far enough in to avoid smearing the cutters with asphalt. This forms an edge-band comprising a layer of the liner 88, a layer of adhesive 89, and a thin liner of felt 87' shown between the slitter 91 and the adhesive 89, which layer of felt 87' is partly impregnated with asphalt to provide reinforcement of the flange thus formed. Such product is comparable in use to those shown in FIGS. 1 to 3, and where the disks 91 in FIG. 13 may cut deeper than the flange is to be wide, the product is comparable in use to that shown in FIG. 4.

It is also to be understood that the invention is not limited to the fiber mat insulation nor to the non-uniformly dense form of its which has been described. Also, a suitable mat may be provided with a second liner as circumstances may require, such liner forming no part of the present invention.

The forms shown are especially useful in attic floors in the spaces between the joists. Insulating fill is commonly spread in such spaces, and disadvantageously, since no moisture barrier is provided. The bats of the present invention may be pushed up into such spaces from the ceiling side, when an attic floor is already laid. The compression of the bat width to fill the space provides a force to hold the strip temporarily in place while the edge-bands are being secured, as in FIG. 2 or FIG. 3, as shown or as inverted. Tight union of the edge-bands to the framing members assists in excluding the passage of moisture into the insulation. Where an unlined face is exposed to cooled air, conditions might effect condensation. Having the said cooler face unlined aids in the passage of any moisture from below into the drier cooler air, thus minimizing danger of condensation in cooperation with the barrier effect of the asphalt-adhered liner.

In actual practice, a wood fiber mat before pressing has an average density of .6 lb. per cu. ft., and on leveling, pressing and drying has an average density of .75 lb. per cu. ft. and is 4 inches thick. After compressing to ½ thickness for shipping the mat recovers 80% of its original thickness. The mat with unfolded reinforcing strips ⅝ inch wide at each edge is made 1¼ inches wider than the space to be filled, such as those between studs on standard 16-inch and 24-inch centers.

Figure 14:
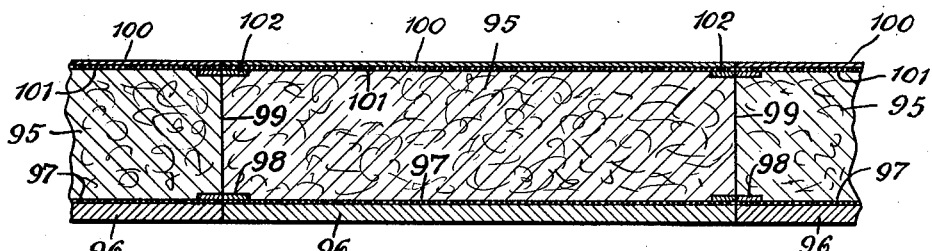
FIG. 14 shows a wide web of insulation provided on both faces with liners in accordance with the present invention, one liner being a rigid board suitable for use as a structural part of a wall.

However, the invention is not limited to the use of flexible liners as described above. The liner may be rigid for use as a structural part of a wall. For example, FIG. 14 illustrates a width 95 of an insulating mat of bonded wood fiber, and numeral 96 represents a liner of rigid material, such as insulating fiberboard. It may be of the type having surface decoration for interior exposure, or the type useful as a plaster base. Numeral 97 indicates an adhesive, preferably a thick layer of asphalt or the like to provide a resistance against the transmission of moisture vapor, the adhesive preferably fully covering the liner 96. Numeral 98 represents partitioning strips across the slitting lines 99. Numeral 100 represents an optional liner of the other side, not necessary for mounting purposes, but applied by adhesive 101 and preferably with partitioning strips 102 over the slitting lines 99, before slitting. For the type of use shown in FIG. 15, the liner 100 is preferably, and for some jurisdictions necessarily, a fire-retardant liner. The use of partitioning strips 101 for such a fire-retardant liner, permits excess thereof to extend beyond the mounted compressed liner, to enhance its protective function. Such excess is shown in FIG. 15 as turned inwardly.

Figure 15:
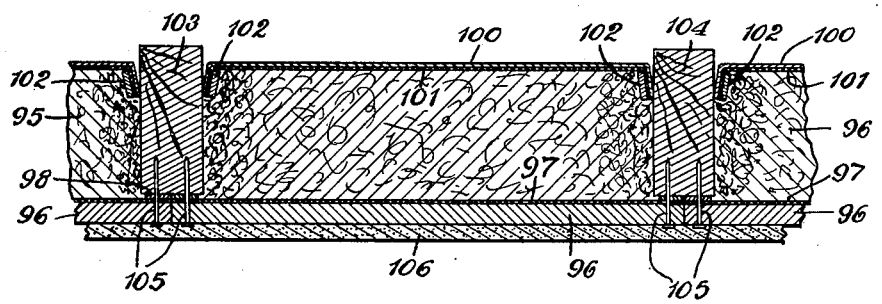
FIG. 15 shows a slit-length of the wide web of FIG. 14 mounted between studs and a plaster coat applied over the rigid board.

After slitting on lines 99, a resulting length may be mounted on two studs 103 and 104 as shown in FIG. 15, by nails or staples 105, thereby providing an interior solid wall, moisture barrier, insulation and fire-retardant liner.

When the web shown in FIG. 14 is slit into widths for framing members, such as studs, of standard spacing, and cut into lengths to extend from floor to ceiling all joints in the board-formed wall may be fixed to the framing structure thereby to avoid opening of joints by contraction of the board, thus offering a perfect base for plaster 106 shown in FIG. 15.

In production, the fire-retardant liner 100 may be applied by the same method and equipment indicated in FIG. 6, however, with the necessary densification of the fibrous web 95, for example, to the uniform density of about 2 lbs. per cu. ft. conventionally used in wall insulation blankets. Then, before slitting, the rigid liner 96 faced with adhesive asphalt and the partitioning strips 102 may be applied.

From the foregoing description, it is apparent that the invention in both method and product is subject to numerous changes and modifications varying from the illustrations and descriptions, without departing from the spirit and scope of the invention as expressed in the appended claims.

I claim:

1. An insulating structure comprising a uniformly wide length of insulating material having a plane face from edge to edge and parallel edge faces at right-angles to said plane face, and a flexible sheet liner adhesively secured to said length at said plane face, said liner being the sole carrier of said length, said liner having its edges coincident with said edge faces and being adhesively secured to said plane face over the entire region between continuous strip areas along said edge faces and unsecured to said length at said strip-areas, and a reversely folded strip secured to said liner at each of said strip-areas with its fold coincident with the edges of the liner and said web, each strip-area being relatively narrow with reference to the width of said region of adhesive union.

2. Thermal insulation comprising an insulating length of insulating material, said length having a plane face from edge to edge and parallel edge-faces at right angles to said plane face, a flexible sheet liner adhesively secured to said plane face within an area inwardly from the edge of said face, said liner terminating at the edges of said plane face, being unsecured to said plane face along a continuous band alongside each edge of said plane face, and being secured to said plane face at the inner edge of each band, flexible partitioning strips each having one face adhesively united to said liner and its other face free, which free faces define said continuous bands, each partitioning strip having a free extension in parallel strip form hinging on a folding line substantially at the edges of said liner, said extensions being foldable into and out of the unsecured areas defining said continuous bands, whereby said extensions when folded outwardly may be used as mounting flanges projecting from the full width of said length, and whereby the laminated bands of liner and partitioning strips may be used as mounting flanges.

3. The method of making thermal insulation which comprises sandwiching unsecured narrow partitioning strips between one face of a web of insulating material having a width permitting it to be slit lengthwise on parallel slitting lines into at least one narrower length and an adhesive-carrying covering sheet liner, said strips being positioned over said slitting lines and in unsecured relation to said web, adhesively uniting said liner to said web and the exposed faces of said strips, said strips being relatively narrow with reference to that portion of the width of said narrower length which lies between adjacent strips, and slitting the adhesively united web and liner along said slitting lines and thereby slitting said strips, whereby strip-reinforced edge-bands of liner are formed at the edges of the resulting narrower length free from facial attachment to the body of insulating material.

4. The method of making thermal insulation which comprises adhesively uniting a covering sheet liner to a web of insulating material having a width permitting it to be slit lengthwise on parallel lines into at least one narrower length having a uniform width by placing adhesive on said liner for location at the interface of said liner and web, said adhesive being positioned to include a strip area to lie within said length alongside each line on which said web is to be slit and to include areas between strip areas, placing folded strips of partitioning material on said liner over said strip areas with the fold thereof located within the area of the length and substantially at the lines of slitting so as to preserve the fold on slitting, securing one face of said strips to said liner by said adhesive and maintaining the other face free from adhesive for facial contact with said web, adhesively combining the remaining portion of said liner to said web, and slitting said combined web and liner along said lines and thereby forming said narrower length, whereby the strip-covered strip-areas provide edge bands of the resulting laminated liner and partitioning strip free from facial attachment to the body of the insulating material, and whereby the resulting infolded portions of the strip may be turned outwardly to project laterally as flanges from the insulation and from the edge band.

References Cited in the file of this patent

UNITED STATES PATENTS

| | | |
|---|---|---|
| 986,655 | Taylor | Mar. 14, 1911 |
| 1,650,266 | Dexter | Nov. 22, 1927 |
| 1,726,040 | Olson | Aug. 27, 1929 |
| 1,802,543 | Upson | Apr. 28, 1931 |
| 1,913,312 | Lines | June 6, 1933 |
| 2,128,549 | Zier | Aug. 30, 1938 |
| 2,172,048 | Johnson | Sept. 5, 1939 |
| 2,254,856 | Randall | Sept. 2, 1941 |
| 2,263,201 | Wheeler et al. | Nov. 18, 1941 |
| 2,414,535 | Kaufman | Jan. 21, 1947 |
| 2,491,281 | Rowe | Dec. 13, 1949 |
| 2,851,730 | Wilhelmi et al. | Sept. 16, 1958 |
| 2,940,884 | White | June 14, 1960 |